(12) United States Patent
Wang

(10) Patent No.: US 11,369,125 B2
(45) Date of Patent: Jun. 28, 2022

(54) PRE-COOLING AND FRESHNESS-PRESERVING COOLING CONTROL DEVICE EMPLOYING DUAL THROTTLING SYSTEMS FOR ICE-CREAM MACHINE, COOLING CONTROL METHOD, AND ICE-CREAM MACHINE

(71) Applicant: GUANGZHOU GUANGSHEN ELECTRIC PRODUCE CO., LTD, Guangdong (CN)

(72) Inventor: Xinbing Wang, Guangdong (CN)

(73) Assignee: GUANGZHOU GUANGSHEN ELECTRIC PRODUCE CO., LTD, Guangdong (CN)

( * ) Notice: Subject to any disclaimer, the term of this patent is extended or adjusted under 35 U.S.C. 154(b) by 190 days.

(21) Appl. No.: 16/605,808

(22) PCT Filed: Aug. 17, 2017

(86) PCT No.: PCT/CN2017/097807
§ 371 (c)(1),
(2) Date: Oct. 17, 2019

(87) PCT Pub. No.: WO2019/000610
PCT Pub. Date: Jan. 3, 2019

(65) Prior Publication Data
US 2020/0120951 A1    Apr. 23, 2020

(30) Foreign Application Priority Data

Jun. 28, 2017    (CN) .......................... 201710504827.X

(51) Int. Cl.
*A23G 9/22*    (2006.01)
*A23G 9/12*    (2006.01)

(52) U.S. Cl.
CPC ............... *A23G 9/228* (2013.01); *A23G 9/12* (2013.01)

(58) Field of Classification Search
CPC ... A23G 9/00; A23G 9/12; A23G 9/16; A23G 9/163; A23G 9/222; A23G 9/224; A23G 9/228
See application file for complete search history.

(56) References Cited

U.S. PATENT DOCUMENTS 4,275,567 A * 6/1981 Schwitters ............. A23G 9/045
62/136
5,158,506 A * 10/1992 Kusano ................... A23G 9/163
62/136
(Continued)

FOREIGN PATENT DOCUMENTS

| CN | 201571460 | 9/2010 |
| CN | 204616961 | 9/2015 |

(Continued)

OTHER PUBLICATIONS

"International Search Report (Form PCT/ISA/210) of PCT/CN2017/097807," dated Mar. 7, 2018, with English translation thereof, pp. 1-4.

*Primary Examiner* — Miguel A Diaz
(74) *Attorney, Agent, or Firm* — Maier & Maier, PLLC

(57) ABSTRACT

A cooling control device comprises a compressor, a condenser, a material reservoir evaporator, a freezing cylinder refrigeration inlet conduit, and a freezing cylinder refrigeration outlet conduit. An outlet end of the condenser is connected to a condenser outlet pipe. The condenser outlet pipe is in communication with three branch pipes, which are a freezing cylinder refrigeration pipe, a material reservoir pre-cooling pipe and a material reservoir freshness-preserving pipe arranged in parallel. The freezing cylinder refrigeration pipe is in communication with the freezing cylinder (Continued)

refrigeration inlet conduit. The material reservoir pre-cooling pipe and the material reservoir freshness-preserving pipe are in communication with an inlet end of the material reservoir evaporator. An outlet end of the material reservoir evaporator and the freezing cylinder refrigeration outlet conduit are respectively in communication with the compressor. The cooling control device can separate a pre-cooling mode and a freshness-preserving mode for a material reservoir.

10 Claims, 10 Drawing Sheets

(56) References Cited

U.S. PATENT DOCUMENTS

| | | | |
|---|---|---|---|
| 6,119,471 A | 9/2000 | Tanaka et al. | |
| 6,119,472 A * | 9/2000 | Ross | A23G 9/225 62/228.2 |
| 2002/0014081 A1 * | 2/2002 | Jones | F25D 29/00 62/66 |
| 2007/0022763 A1 * | 2/2007 | Moulder | A23G 9/12 62/135 |
| 2011/0154849 A1 * | 6/2011 | Zimmermann | F25B 40/00 62/324.6 |
| 2013/0269540 A1 * | 10/2013 | Lazzarini | A23C 9/1223 99/455 |
| 2015/0306639 A1 * | 10/2015 | Cocchi | B08B 9/0804 134/18 |
| 2015/0362222 A1 * | 12/2015 | Matsuda | F25B 41/00 62/324.1 |
| 2017/0030627 A1 * | 2/2017 | Kim | F25D 11/022 |
| 2018/0149404 A1 * | 5/2018 | Kilinc | F25D 11/022 |
| 2018/0209711 A1 * | 7/2018 | Singh | F25B 41/37 |
| 2018/0289035 A1 * | 10/2018 | Cocchi | F25B 39/00 |
| 2020/0120951 A1 * | 4/2020 | Wang | A23G 9/228 |
| 2021/0033332 A1 * | 2/2021 | Vijayan | F25D 17/067 |

FOREIGN PATENT DOCUMENTS

| | | | |
|---|---|---|---|
| CN | 106819340 | 6/2017 | |
| DE | 29517253 U1 * | 2/1996 | A23G 9/305 |
| JP | H04179446 | 6/1992 | |
| JP | 2001252023 | 9/2001 | |
| JP | 2001252023 A * | 9/2001 | |
| JP | 2006238704 | 9/2006 | |
| JP | 2010263922 A * | 11/2010 | |

* cited by examiner

PRE-COOLING AND FRESHNESS-PRESERVING COOLING CONTROL DEVICE EMPLOYING DUAL THROTTLING SYSTEMS FOR ICE-CREAM MACHINE, COOLING CONTROL METHOD, AND ICE-CREAM MACHINE

CROSS-REFERENCE TO RELATED APPLICATION

This application is a 371 of international application of PCT application Ser. No. PCT/CN2017/097807, filed on Aug. 17, 2017, which claims the priority benefit of China application no. 201710504827.X, filed on Jun. 28, 2017. The entirety of each of the above mentioned patent applications is hereby incorporated by reference herein and made a part of this specification.

BACKGROUND

Technical Field

The invention relates to an ice-cream device and a cooling control method, and in particular, to a pre-cooling and freshness-preserving cooling control device employing dual throttling systems for an ice-cream machine, a cooling control method, and an ice-cream machine.

Description of Related Art

As a machine for producing ice-cream, the ice-cream machine has been widely used in various commercial places and has been increasingly common in households.

A conventional ice-cream machine is generally composed of main components such as a body, a material reservoir, a material reservoir mixer, a material reservoir mixing motor, a freezing cylinder, a freezing cylinder mixer, a freezing cylinder mixing motor, a discharge head, a compressor, various types of sensors, an electronic control panel, and a control display panel.

The basic working process of the conventional ice-cream machine is: the prepared ice-cream slurry is poured into the material reservoir; after refrigeration is started in the control display panel, the compressor and the mixing motor start to operate; after the sensor detects that the ice-cream has solidified, the compressor and the mixing motor are stopped; and when the ice-cream is solidifying or after the motor is stopped, the ice-cream may be squeezed from the discharge head as needed. Its working principle is that, after the liquid ice-cream material stored in the material reservoir flows into the freezing cylinder, the ice-cream liquid slurry is mixed by the freezing cylinder mixer while being refrigerated in the freezing cylinder; and the refrigerated semi-solid ice-cream is cut from the inner cylinder of the evaporator by the spiral blade of the mixer and at the same time pushed forward by the spiral blade of the freezing cylinder mixer.

In order to ensure that the raw materials in the material reservoir of the ice-cream machine do not deteriorate, the material reservoir is generally refrigerated in two ways in the industry. One is to refrigerate the material reservoir through a separate refrigeration system, which is commonly known as real pre-cooling. The other is to refrigerate the material reservoir through the main refrigeration compressor (i.e., the refrigeration compressor of the freezing cylinder), which is commonly known as pseudo pre-cooling.

The ice-cream slurry is a dairy product and is prone to breeding of harmful bacteria such as *Escherichia coli* and *Salmonella*. At a temperature above 10° C., the quality of the slurry in the material reservoir can only last for several hours. 2 to 8° C. is commonly known as the safe temperature, at which the quality of the slurry can last for about 5 days. However, the safe temperature and storage time depend on the compositions and contents of the various raw materials.

If the slurry is to be stored overnight in the machine or stored standby during daytime, the machine must have a freshness-preserving function. Namely, after the machine is started, both the material reservoir and the freezing cylinder should keep the slurry within the safe temperature.

The following analyzes the principles and advantages/disadvantages of pre-cooling structures of various current ice-cream machines.

A schematic view of a refrigeration principle of an ice-cream machine with a material reservoir pre-cooling function in the related art is as shown in FIG. 1. The ice-cream machine uses two compressors. A cooling control device of the ice-cream machine includes a compressor 1, a condenser 2, a material reservoir evaporator, a freezing cylinder refrigeration inlet conduit, and a freezing cylinder refrigeration outlet conduit. The material reservoir evaporator is a coil surrounding the material reservoir 11. Both the compressor 1 and the condenser 2 are provided in two sets. One set is used for refrigeration of the freezing cylinder, and the other set is used for refrigeration of the material reservoir.

In the freezing cylinder refrigeration circuit, a freezing cylinder refrigeration pipe 102 is connected between the outlet end of the condenser 2 and the freezing cylinder refrigeration inlet conduit, the freezing cylinder refrigeration outlet conduit is connected to the compressor 1, and the middle segment of the freezing cylinder refrigeration pipe 102 is a freezing cylinder refrigeration capillary segment 15.

In the material reservoir refrigeration circuit, the outlet end of the condenser 2 is in communication with the inlet end of the material reservoir evaporator via a material reservoir pre-cooling pipe 103, the outlet end of the material reservoir evaporator is in communication with the compressor 1, and the middle segment of the material reservoir pre-cooling pipe 103 is a material reservoir pre-cooling capillary segment 16.

The above pre-cooling and freshness-preserving structure of the ice-cream machine is commonly known as real pre-cooling in the industry. Its advantage is that the temperature of the material reservoir is controlled by independent refrigeration compressor and refrigeration system, so the temperature control is precise, the cooling speed is high, and energy consumption is low. Its disadvantage is that the structure is complicated, the cost is high, more machine space is occupied, and it is difficult to apply to small-sized ice-cream machines.

An ice-cream machine with a material reservoir pre-cooling function using one compressor in the related art is as shown in FIG. 2 to FIG. 4. The ice-cream machine includes a body 12, a material reservoir 11, a material reservoir mixer 13, a material reservoir mixing motor, a freezing cylinder 3, a freezing cylinder mixer 14, a freezing cylinder mixing motor, a discharge head, a sensor, an electronic control panel, a control display panel, and a cooling control device. The material reservoir mixer 13 is installed in the material reservoir 11 and is connected to the material reservoir mixing motor. The freezing cylinder mixer 14 is inserted in the freezing cylinder 3 and is connected to the freezing cylinder mixing motor. The electronic control panel is configured to control the operation of each component.

The cooling control device of the ice-cream machine includes a compressor 1, a condenser 2, a material reservoir evaporator 4, a freezing cylinder refrigeration inlet conduit 31, and a freezing cylinder refrigeration outlet conduit 32. The material reservoir evaporator 4 is a coil surrounding the material reservoir 11. The compressor 1 is in communication with the inlet end of the condenser 2 via a compression pipe 101. The outlet end of the condenser 2 is connected to a condenser outlet pipe 106.

The condenser outlet pipe 106 is in communication with two branch pipes respectively. The condenser outlet pipe 106 is also provided with a filter 10 on a tube segment before branching. The two branch pipes are a freezing cylinder refrigeration pipe 102 and a material reservoir pre-cooling pipe 103 which are arranged in parallel. The freezing cylinder refrigeration pipe 102 is in communication with the freezing cylinder refrigeration inlet conduit 31. The material reservoir pre-cooling pipe 103 is in communication with the inlet end of the material reservoir evaporator 4. The outlet end of the material reservoir evaporator 4 and the freezing cylinder refrigeration outlet conduit 32 are respectively in communication with the compressor 1. The freezing cylinder refrigeration pipe 102 is provided with a refrigeration solenoid valve 5. The middle segment of the freezing cylinder refrigeration pipe 102 is a freezing cylinder refrigeration capillary segment 15. The material reservoir pre-cooling pipe 103 is provided with a pre-cooling solenoid valve 6. The middle segment of the material reservoir pre-cooling pipe 103 is a material reservoir pre-cooling capillary segment 16. The cooling control device controls the material reservoir and the freezing cylinder through controlling the solenoid valves.

The above pre-cooling structure of the ice-cream machine is commonly known as pseudo pre-cooling. For cost and machine structure-related reasons, the pseudo pre-cooling structure is widely applied in ice-cream machines, especially in small-sized desktop models. The pre-cooling structure and the refrigeration mode currently applied in the industry are generally the following: the refrigerant flows from the main refrigeration system, and the valve is controlled according to the temperature change in the material reservoir to control the on/off state of the refrigerant in the material reservoir to thereby achieve the purpose of refrigeration and temperature control of the ice-cream material in the material reservoir.

The advantage and disadvantage of the related art are the following. The advantage is that the refrigeration system has a simple structure and low costs. The disadvantage is that the temperature control precision is poor, the refrigeration capacity and the refrigeration speed of the material reservoir are limited, and the material reservoir refrigeration, when turned on, has a great influence on the refrigeration performance of the main cylinder, so a balance between freezing cylinder refrigeration and material reservoir refrigeration cannot be effectively achieved.

SUMMARY

A first purpose of the invention is to provide a pre-cooling and freshness-preserving cooling control device employing dual throttling systems for an ice-cream machine. The cooling control device can truly realize separation of the pre-cooling mode and the freshness-preserving mode of the material reservoir and perform pre-cooling and freshness preservation on the material reservoir of the ice-cream machine respectively in the two modes. Therefore, during both normal daily operation and the standby mode of the machine, it is ensured that the temperature of the ice-cream material in the material reservoir can be precisely controlled, and the effect of pre-cooling on the main refrigeration cylinder can be minimized in the operating mode. During nighttime freshness preservation or the standby mode, the raw material in the material reservoir and the freezing cylinder can be controlled within the safe temperature range as precisely as possible, and the overall energy consumption of the machine in the two modes can be minimized.

The above purpose of the invention is achieved through the following technical solution. A pre-cooling and freshness-preserving cooling control device employing dual throttling systems for an ice-cream machine, the cooling control device including a compressor, a condenser, a material reservoir evaporator, a freezing cylinder refrigeration inlet conduit, and a freezing cylinder refrigeration outlet conduit, wherein the material reservoir evaporator is a coil surrounding a material reservoir, and the compressor is in communication with an inlet end of the condenser via a compression pipe, wherein an outlet end of the condenser is connected to a condenser outlet pipe, the condenser outlet pipe is in communication with three branch pipes respectively, the three branch pipes are a freezing cylinder refrigeration pipe, a material reservoir pre-cooling pipe, and a material reservoir freshness-preserving pipe which are arranged in parallel, the freezing cylinder refrigeration pipe is in communication with the freezing cylinder refrigeration inlet conduit, the material reservoir pre-cooling pipe and the material reservoir freshness-preserving pipe are both in communication with an inlet end of the material reservoir evaporator, an outlet end of the material reservoir evaporator and the freezing cylinder refrigeration outlet conduit are respectively in communication with the compressor, the freezing cylinder refrigeration pipe is provided with a refrigeration solenoid valve, a middle segment of the freezing cylinder refrigeration pipe is a freezing cylinder refrigeration capillary segment, the material reservoir pre-cooling pipe is provided with a pre-cooling solenoid valve, a middle segment of the material reservoir pre-cooling pipe is a material reservoir pre-cooling capillary segment, the material reservoir freshness-preserving pipe is provided with a freshness-preserving solenoid valve, and a middle segment of the material reservoir freshness-preserving pipe is a material reservoir freshness-preserving capillary segment, wherein the cooling control device is capable of separately controlling a pre-cooling mode and a freshness-preserving mode of the material reservoir to thereby achieve pre-cooling and freshness-preserving functions of the material reservoir.

In the invention, the freezing cylinder refrigeration capillary segment has an inner diameter of 0.5 to 1.8 mm and a length of 500 to 4000 mm.

In the invention, the material reservoir pre-cooling capillary segment has an inner diameter of 0.3 to 1.6 mm and a length of 500 to 3500 mm.

In the invention, the material reservoir freshness-preserving capillary segment has an inner diameter of 0.4 to 1.6 mm and a length of 500 to 3500 mm.

The invention may be modified as follows: the condenser outlet pipe is further provided with a filter on a tube segment before branching.

The invention may be modified as follows: the outlet end of the material reservoir evaporator is further provided with a check valve to prevent a refrigerant in the main freezing cylinder from flowing to the material reservoir evaporator when the material reservoir evaporator stops refrigeration.

The invention may be modified as follows: a defrosting pipe further branches out from the compression pipe, wherein an outlet end of the defrosting pipe is in communication with the freezing cylinder refrigeration inlet conduit, and the defrosting pipe is provided with a defrosting solenoid valve.

A second purpose of the invention is to provide a cooling control method for the above pre-cooling and freshness-preserving cooling control device employing dual throttling systems for an ice-cream machine, wherein the cooling control method is simple and convenient to operate.

The above purpose of the invention is achieved through the following technical solution. A cooling control method for the above pre-cooling and freshness-preserving cooling control device employing dual throttling systems for an ice-cream machine, wherein the method includes a material reservoir pre-cooling mode and a material reservoir freshness-preserving mode.

The material reservoir pre-cooling mode includes steps below.

(1) Automatically starting material reservoir pre-cooling according to a set program when freezing cylinder refrigeration is started.

(2) When the ice-cream machine is powered and started up for a first time, starting the pre-cooling solenoid valve to enter a work cycle only when a solidification ratio of an ice-cream material in the material reservoir is detected to rise to a set value and after a freezing cylinder refrigeration cycle is started.

(3) At any time, when a material is discharged, stopping the pre-cooling solenoid valve for T seconds, and if no material is discharged in T seconds, turning on the pre-cooling solenoid valve, where T is in a range of 1 to 240.

(4) A pre-cooling temperature is a set value of a freshness-preserving temperature+N1 degrees, and an on-off temperature difference of the pre-cooling temperature is N2 degrees; after the pre-cooling temperature is reached, turning off the pre-cooling solenoid valve, where N1 is in a range of 1 to 20, and N2 is in a range of 0.5 to 15.

The material reservoir freshness-preserving mode includes steps below.

(1) When freshness preservation is initially started, stalling freezing cylinder refrigeration, turning on a freezing cylinder mixing motor, the refrigeration solenoid valve and the freshness-preserving solenoid valve, and meanwhile, intermittently operating a material reservoir mixing motor according to a pattern of turning on for T3 and off for T4; when the solidification ratio of the ice-cream material in the material reservoir is detected to reach a set ratio value or when a return gas temperature of the compressor or an evaporation cylinder temperature reaches a set temperature value, turning off the refrigeration solenoid valve, and stopping the freezing cylinder mixing motor, where T3 and T4 are both in a range of 1 to 600 seconds.

(2) After the refrigeration solenoid valve is turned off and the freezing cylinder mixing motor is stopped, continually turning on the freshness-preserving solenoid valve and the material reservoir mixing motor; when the freshness-preserving temperature reaches a set temperature value, stopping the compressor, and intermittently operating the material reservoir mixing motor according to a pattern of turning on for T5 and off for T6, where T5 and T6 are both in a range of 1 to 600 seconds.

(3) When a material temperature in the material reservoir rises to an upper limit value of the freshness-preserving temperature, repeating step (2).

(4) After the refrigeration solenoid valve is turned off and the freezing cylinder mixing motor is stopped, and after a turn-off time of the refrigeration solenoid valve reaches a set time value T1 and when the material temperature in the material reservoir rises to start the compressor, turning on the refrigeration solenoid valve and the freezing cylinder mixing motor, detecting again the solidification ratio of the ice-cream material in the material reservoir, the return gas temperature of the compressor, or the evaporator cylinder temperature to repeat a cycle of step (1), where T1 is in a range of 5 to 240 minutes.

(5) Setting a range value of an on-off temperature difference of the freshness-preserving temperature to 0.2 to 15 degrees.

The invention may be modified as follows: the method further including a freezing cylinder defrosting mode, the freezing cylinder defrosting mode including steps below.

(1) At the time of defrosting, turning on the compressor and the defrosting solenoid valve, and after a set time T7, starting the freezing cylinder mixing motor.

(2) At the time of defrosting, turning off the pre-cooling solenoid valve and the freshness-preserving solenoid valve;

(3) When a defrosting time reaches T7 or an evaporation temperature N3 reaches a set value, automatically stopping defrosting, where T7 is in a range of 1 to 20 minutes, and N3 is in a range of −10 to 80 degrees.

(4) When defrosting is completed for a first time within a time T8, performing defrosting for a second time, and a second defrosting time is T9, where T8 is in a range of 1 to 240 seconds, and T9 is in a range of 1 to 180 seconds.

In the present application, the solidification ratio of the ice-cream machine refers to a ratio of the variation value tendency of the rotation speed or current of the mixing motor caused by the viscosity change of the ice-cream in the freezing cylinder. Under normal circumstances, as the viscosity of the ice-cream increases, the rotation speed of the mixing motor decreases, the current of the mixing motor increases, and the electronic control system shows that the solidification ratio increases. As the viscosity of the ice-cream decreases, the rotation speed of the mixing motor increases, the current of the mixing motor decreases, and the electronic control system shows that the solidification ratio decreases.

A third purpose of the invention is to provide an ice-cream machine including the above pre-cooling and freshness-preserving cooling control device employing dual throttling systems for an ice-cream machine, wherein the ice-cream machine is capable of separating the pre-cooling mode and the freshness-preserving mode of the material reservoir.

The simple definitions for pre-cooling and freshness preservation in the invention are respectively the following. Pre-cooling refers to pre-refrigeration and temperature maintenance of the raw material in the material cylinder during normal refrigeration operation of the main cylinder. Freshness preservation refers to long-time safe temperature maintenance of the raw material in the freezing cylinder and the material cylinder during standby of the whole machine or the nighttime machine stop state. The nighttime machine stop means that the machine is powered and in the freshness-preserving state.

The above purpose of the invention is achieved through the following technical solution. An ice-cream machine includes the above pre-cooling and freshness-preserving cooling control device employing dual throttling systems for an ice-cream machine, wherein the ice-cream machine further includes a body, a material reservoir, a material reservoir mixer, the material reservoir mixing motor, a freezing cylinder, a freezing cylinder mixer, the freezing cylinder mixing motor, a discharge head, a sensor, an electronic control panel, and a control display panel, wherein the material reservoir mixer is installed in the material reservoir and is connected to the material reservoir mixing motor, the freezing cylinder mixer is inserted in the freezing cylinder and is connected to the freezing cylinder mixing motor, and the electronic control panel is configured to control operation of each component.

Compared with the related art, the invention has the following significant effects.

1. The invention defies the idea of regarding pre-cooling and freshness preservation as one thing in the ice-cream machine industry and truly separates the pre-cooling mode and the freshness-preserving mode as two control modes. Moreover, the invention adopts two different refrigeration throttling systems corresponding to different evaporation temperatures and refrigeration capacities.

2. The pre-cooling mode of the invention refers to pre-cooling of the material reservoir during daytime sale and can ensure that the raw material in the material reservoir is maintained in a set temperature range during general daytime material supply and sale, and the raw material is better kept undeteriorated in the normal time period. Meanwhile, since a specific refrigeration throttling system is used (the pre-cooling throttling system is designed to be smaller than the main refrigeration cylinder, and only a small amount of the refrigerant enters the pre-cooling system when the pre-cooling throttling system is turned on), it is possible to minimize the influence on the refrigeration speed of the main refrigeration cylinder when the pre-cooling mode is turned on, and ensure the refrigeration and discharging capacity of the main refrigeration system during daytime sale.

3. The freshness-preserving mode of the invention refers to low-temperature freshness preservation of the raw material in the material reservoir and the main freezing cylinder during nighttime or daytime standby and can ensure that the raw material in the material reservoir and the freezing cylinder is stored for a long time in the safe temperature range, which is generally set to 2 to 8 degrees. Meanwhile, since a specific refrigeration throttling system is used (the freshness-preserving throttling system is designed to have a flow rate larger than the pre-cooling throttling and can ensure that the compressor can work for a long time when the freshness-preserving solenoid valve alone is turned on, the raw material in the material reservoir can be rapidly cooled, and the temperature of the raw material in the material reservoir can be stably controlled), when the freshness-preserving mode is turned on, freezing cylinder refrigeration and the freezing cylinder mixing motor stop operating while the low temperature of the ice-cream in the main cooling cylinder is ensured, so that long-time refrigeration and freshness preservation can be separately performed on the raw material in the material reservoir, the energy consumption of the whole machine can be significantly reduced, and meanwhile, the texture of the ice-cream after start-up of the machine the next day can be significantly improved.

4. Since the invention adopts a specific refrigeration throttling system and a control program, the overall power of the ice-cream machine is significantly reduced in the freshness-preserving mode, generally to about 50 to 80% of the normal refrigeration mode.

BRIEF DESCRIPTION OF THE DRAWINGS

The invention will be further described in detail below with reference to the accompanying drawings and specific embodiments.

DESCRIPTION OF THE EMBODIMENTS

Embodiment 1

Figure 1:
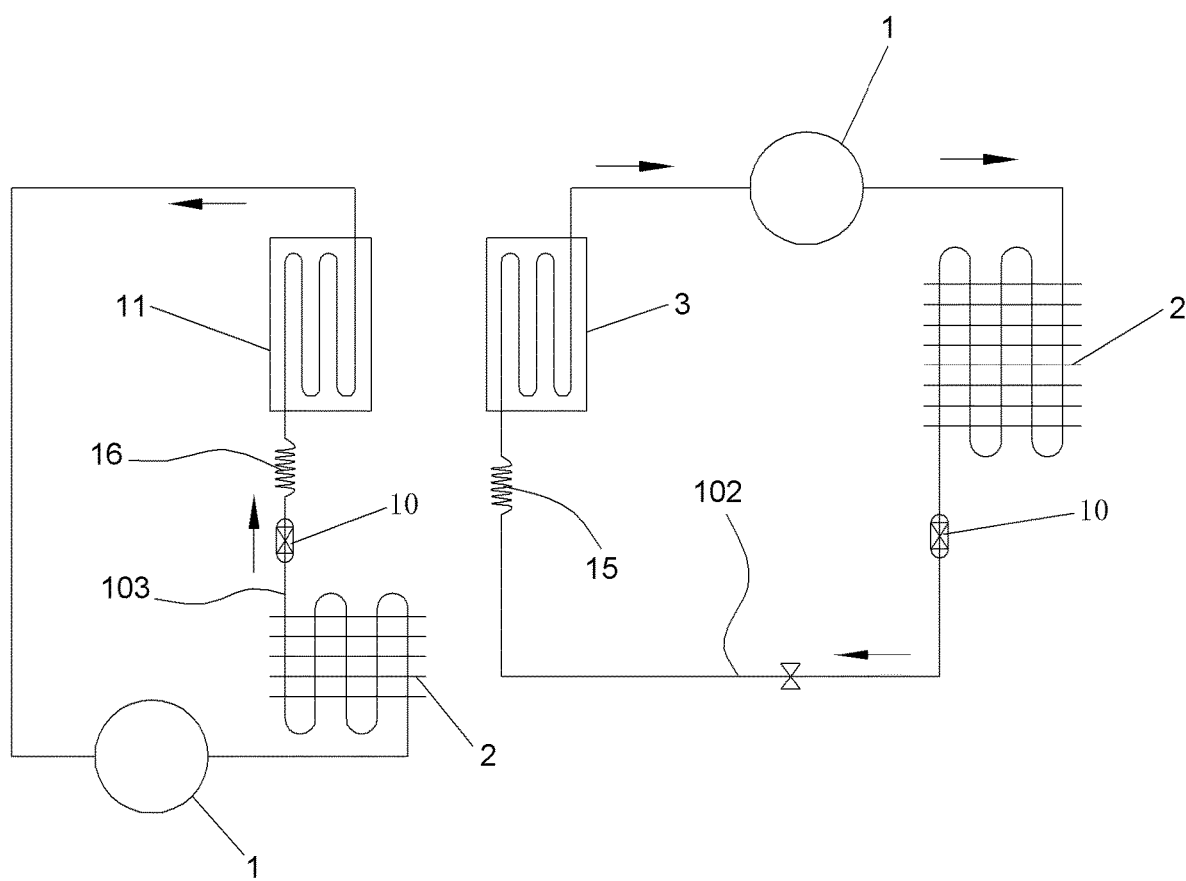
FIG. 1 is a schematic view of a refrigeration principle of an ice-cream machine with a material reservoir pre-cooling function in the related art, wherein the ice-cream machine uses two compressors.
Figure 2:
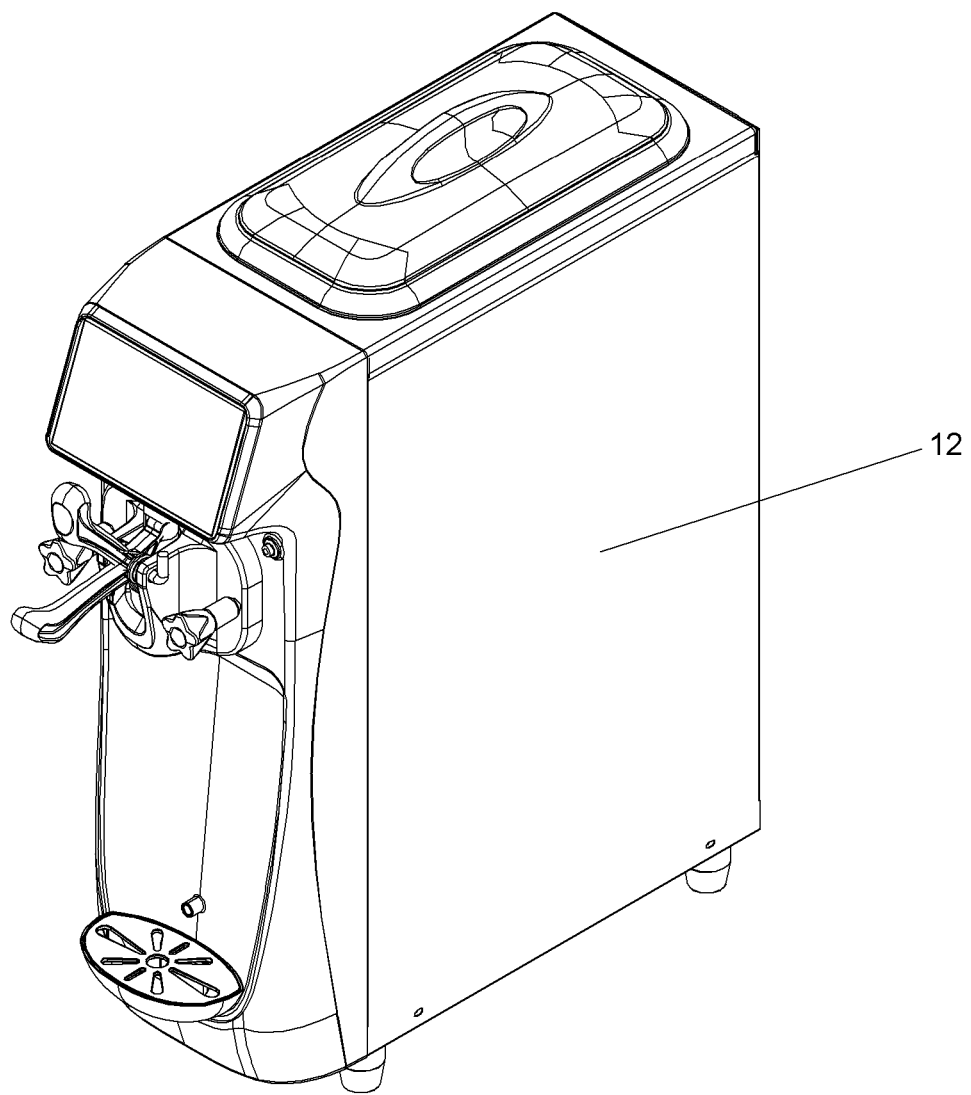
FIG. 2 is a schematic view of an overall structure of an ice-cream machine with a material reservoir pre-cooling function in the related art, wherein the ice-cream machine uses one compressor.
Figure 3:
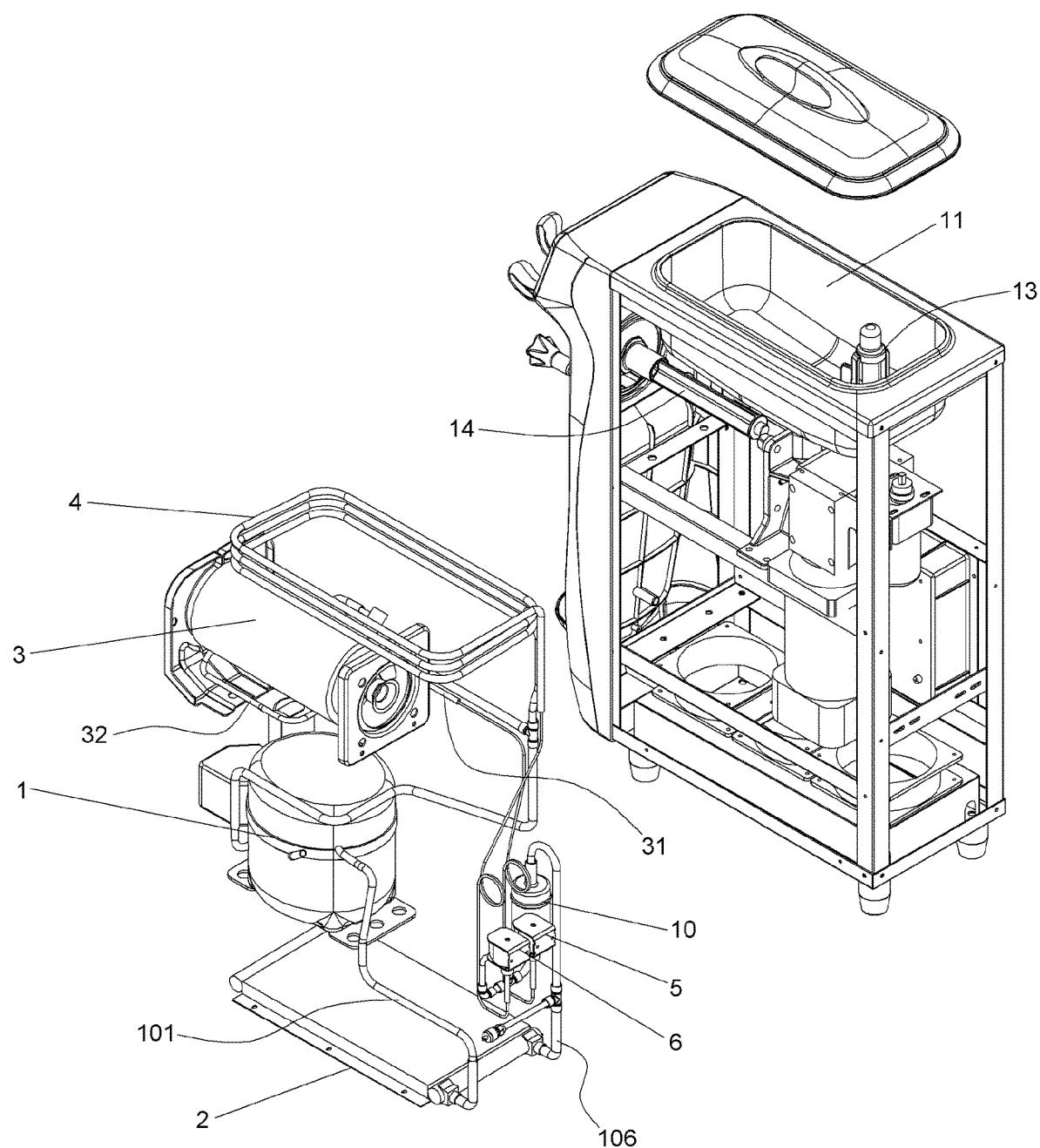
FIG. 3 is a partial exploded structural view of FIG. 2.
Figure 4:
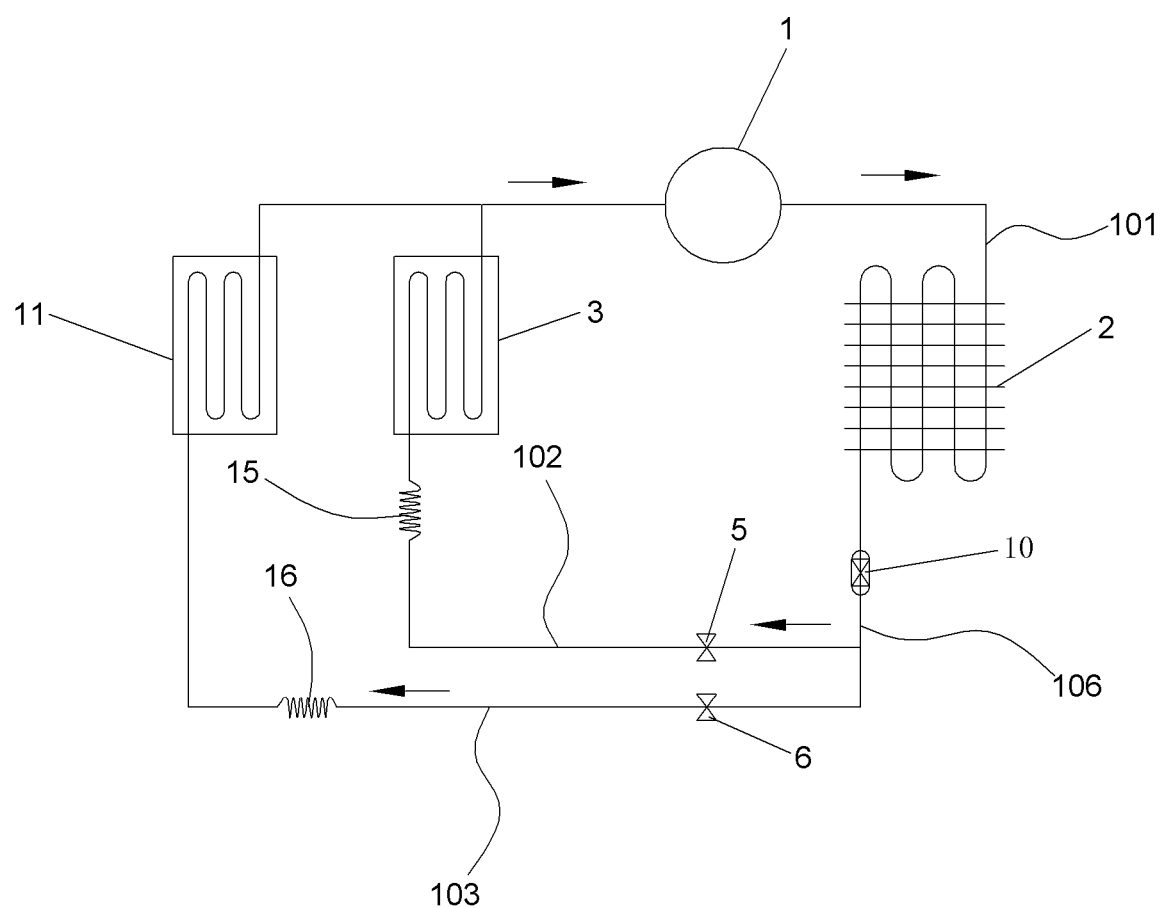
FIG. 4 is a schematic view of a refrigeration principle of the ice-cream machine shown in FIG. 2.
Figure 5:
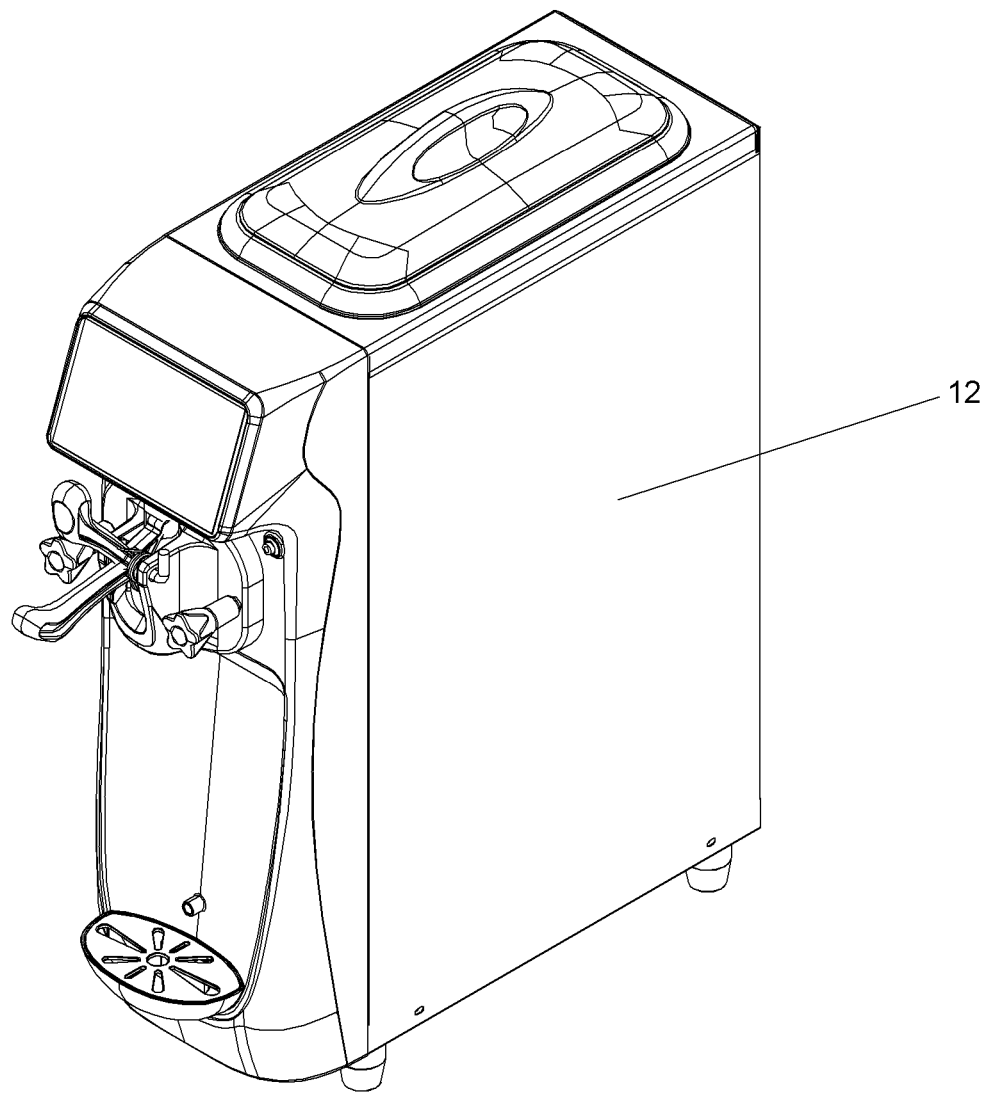
FIG. 5 is a schematic view of an overall structure of Embodiment 1 of a pre-cooling and freshness-preserving ice-cream machine employing dual throttling systems of the invention.
Figure 6:
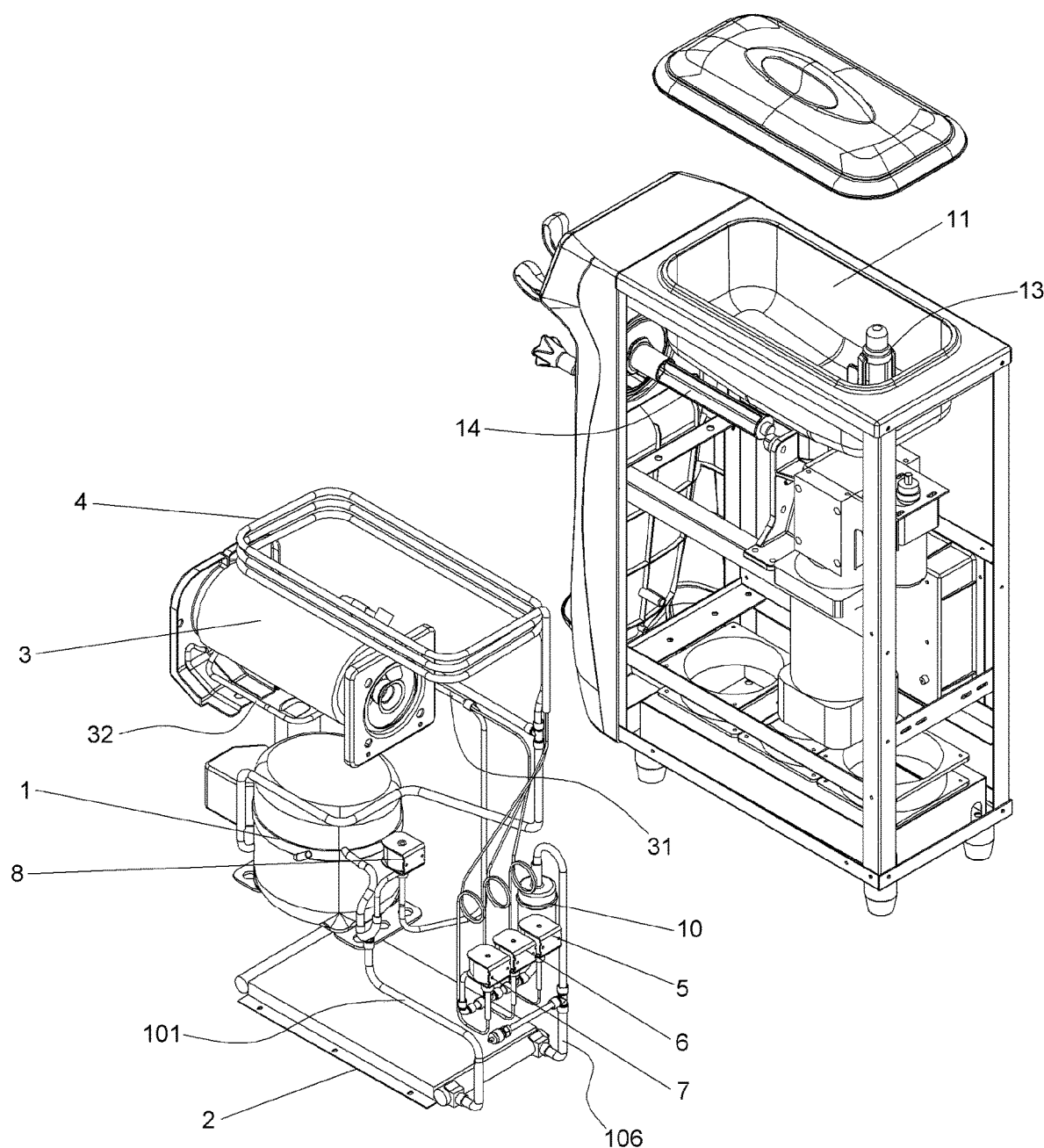
FIG. 6 is a partial exploded structural view of FIG. 5.
Figure 7:
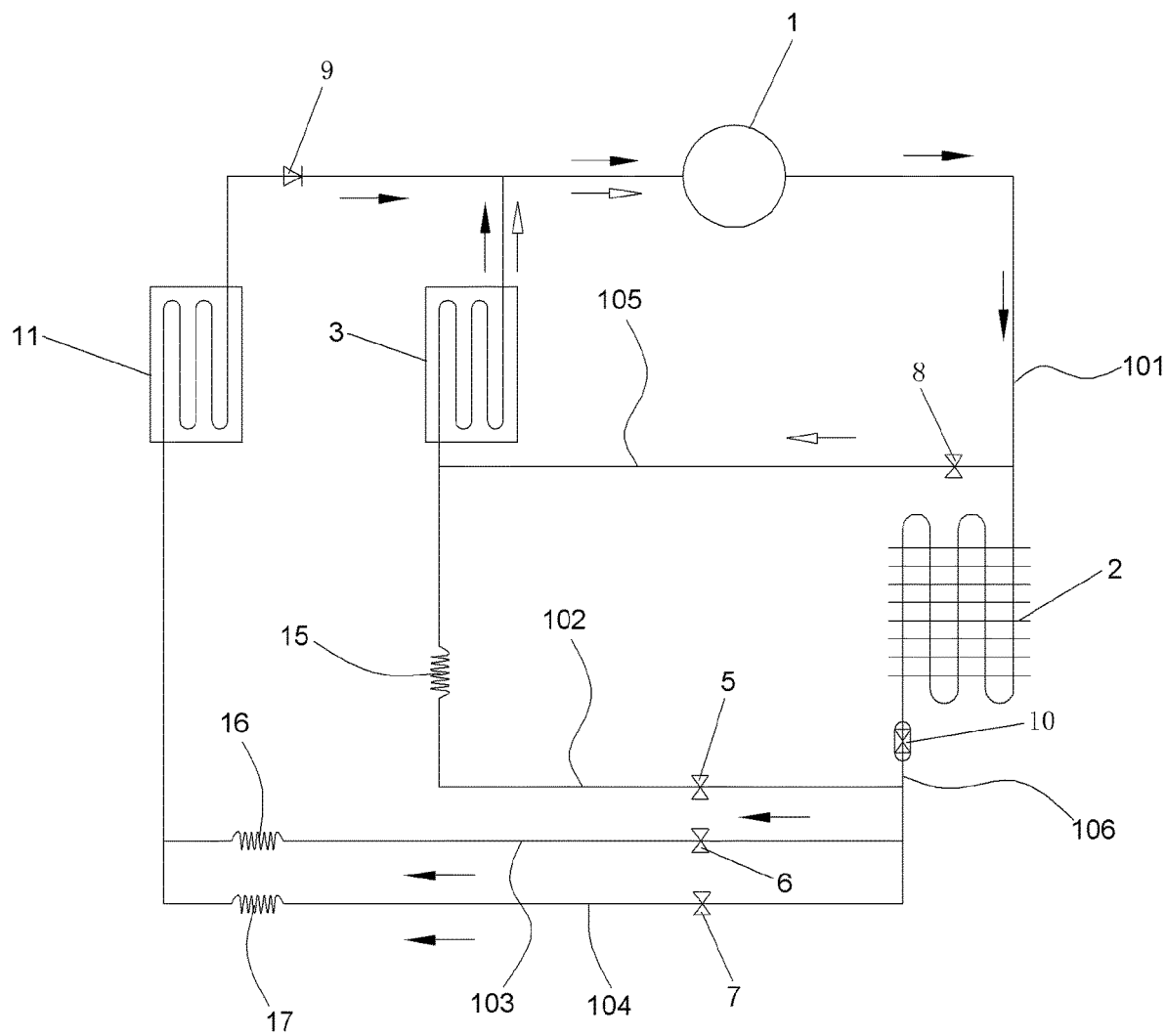
FIG. 7 is a schematic view of a refrigeration principle of the ice-cream machine shown in FIG. 5, in which a solid arrow indicates a refrigeration route and a hollow arrow indicates a heating route.

Embodiment 1 of a pre-cooling and freshness-preserving ice-cream machine employing dual throttling systems of the invention is as shown in FIG. 5 to FIG. 7. The ice-cream machine includes a body 12, a material reservoir 11, a material reservoir mixer 13, a material reservoir mixing motor, a freezing cylinder 3, a freezing cylinder mixer 14, a freezing cylinder mixing motor, a discharge head, a sensor, an electronic control panel, a control display panel, and a cooling control device. The material reservoir mixer 13 is installed in the material reservoir 11 and is connected to the material reservoir mixing motor. The freezing cylinder mixer 14 is inserted in the freezing cylinder 3 and is connected to the freezing cylinder mixing motor. The electronic control panel is configured to control the operation of each component.

The cooling control device in the present embodiment includes a compressor 1, a condenser 2, a material reservoir evaporator 4, a freezing cylinder refrigeration inlet conduit 31, and a freezing cylinder refrigeration outlet conduit 32. The material reservoir evaporator 4 is a coil surrounding the material reservoir 11. The compressor 1 is in communication with the inlet end of the condenser 2 via a compression pipe 101. The outlet end of the condenser 2 is connected to a condenser outlet pipe 106.

The condenser outlet pipe 106 is in communication with three branch pipes, respectively. The condenser outlet pipe 106 is also provided with a filter 10 on a tube segment before branching. The three branch pipes are a freezing cylinder refrigeration pipe 102, a material reservoir pre-cooling pipe 103, and a material reservoir freshness-preserving pipe 104 which are arranged in parallel. The freezing cylinder refrigeration pipe 102 is in communication with the freezing cylinder refrigeration inlet conduit 31. The material reservoir pre-cooling pipe 103 and the material reservoir freshness-preserving pipe 104 are both in communication with the inlet end of the material reservoir evaporator 4. The outlet end of the material reservoir evaporator 4 and the freezing cylinder refrigeration outlet conduit 32 are respectively in communication with the compressor 1. The outlet end of the material reservoir evaporator 4 is also provided with a check valve 9. The freezing cylinder refrigeration pipe 102 is provided with a refrigeration solenoid valve 5. The middle segment of the freezing cylinder refrigeration pipe 102 is a freezing cylinder refrigeration capillary segment 15. The material reservoir pre-cooling pipe 103 is provided with a pre-cooling solenoid valve 6. The middle segment of the material reservoir pre-cooling pipe 103 is a material reservoir pre-cooling capillary segment 16. The material reservoir freshness-preserving pipe 104 is provided with a freshness-preserving solenoid valve 7. The middle segment of the material reservoir freshness-preserving pipe 104 is a material reservoir freshness-preserving capillary segment 17.

The cooling control device is capable of separately controlling a pre-cooling mode and a freshness-preserving mode of the material reservoir to thereby achieve pre-cooling and freshness-preserving functions of the material reservoir.

In the present embodiment, refrigeration refers to refrigeration of the freezing cylinder, pre-cooling refers to pre-cooling of the material reservoir, and freshness-preserving refers to freshness-preserving of the material reservoir.

In the present embodiment, the freezing cylinder refrigeration capillary segment 15 has an inner diameter of 1.2 mm and a length of 2500 mm. The material reservoir pre-cooling capillary segment 16 has an inner diameter of 0.4 mm and a length of 2200 mm. The material reservoir freshness-preserving capillary segment 17 has an inner diameter of 0.6 mm and a length of 2200 mm.

As an alteration of the present embodiment, the freezing cylinder refrigeration capillary segment 15 may have an inner diameter in the range of 0.5 to 1.8 mm and a length in the range of 500 to 4000 mm. The material reservoir pre-cooling capillary segment 16 may have an inner diameter in the range of 0.3 to 1.6 mm and a length in the range of 500 to 3500 mm. The material reservoir freshness-preserving capillary segment 17 may have an inner diameter in the range of 0.4 to 1.6 mm and a length in the range of 500 to 3500 mm.

In the present embodiment, a defrosting pipe 105 further branches out from the compression pipe 101. The outlet end of the defrosting pipe 105 is in communication with the freezing cylinder refrigeration inlet conduit 31. The defrosting pipe 105 is provided with a defrosting solenoid valve 8.

A cooling control method for the above pre-cooling and freshness-preserving cooling control device employing dual throttling systems for an ice-cream machine includes a material reservoir pre-cooling mode, a material reservoir freshness-preserving mode, and a freezing cylinder defrosting mode.

The material reservoir pre-cooling mode refers to pre-cooling of the raw material in the material reservoir in the normal startup refrigeration mode. It functions to refrigerate and cool the newly added raw material to increase the refrigeration speed of the main cylinder, and meanwhile, to refrigerate and maintain temperature of the raw material in the material reservoir during daily startup to ensure that the raw material of the material reservoir does not deteriorate or go off-flavor.

The material reservoir pre-cooling mode includes the following steps.

(1) Material reservoir pre-cooling is automatically started when freezing cylinder refrigeration is started.

(2) When the ice-cream machine is powered and started up for the first time, only when the solidification ratio of the ice-cream material in the material reservoir is detected to rise to a set value (e.g., 99%) and after the freezing cylinder refrigeration cycle is started does the pre-cooling solenoid valve start to enter the work cycle.

(3) At any time, when the material is discharged, the pre-cooling solenoid valve is stopped for T seconds (e.g., 5 seconds), and if no material is discharged in 5 seconds, the pre-cooling solenoid valve is turned on, where T may also be in the range of 1 to 240.

(4) The pre-cooling temperature is the set value of the freshness-preserving temperature+N1 degrees (e.g., 10 degrees). The on-off temperature difference of the pre-cooling temperature is N2 degrees (e.g., 6 degrees). At any time, after the pre-cooling temperature is reached, the pre-cooling solenoid valve is turned off. N1 may also be in the range of 1 to 20, N2 may also be in the range of 0.5 to 15, the freshness-preserving temperature may be set by the customer in a machine control screen, and the setting range of the freshness-preserving temperature is generally 1 to 15 degrees.

The material reservoir freshness-preserving mode refers to freshness preservation of the raw material in the material reservoir of the ice-cream machine and the ice-cream material in the main freezing cylinder during nighttime or daily business close-down. It functions to refrigerate, cool, and maintain temperature of the raw material in the material reservoir and the ice-cream material in the main freezing cylinder to ensure that the raw material in the material reservoir and the ice-cream material in the main freezing cylinder can be kept at a set temperature for a long time to ensure that the ice-cream material in the machine does not deteriorate and go off-flavor.

The material reservoir freshness-preserving mode includes the following steps.

(1) When freshness preservation is initially started, freezing cylinder refrigeration is started, the freezing cylinder mixing motor, the refrigeration solenoid valve, and the freshness-preserving solenoid valve are turned on, and meanwhile, the material reservoir mixing motor is operated intermittently according to a pattern of turning on for T3 and off for T4, where T3 and T4 are both 10 seconds, and T3 and T4 may also be in the range of 1 to 600 seconds. When the solidification ratio of the ice-cream material in the material reservoir is detected to reach a set ratio value (e.g., 85%), when the return gas temperature of the compressor reaches a set temperature value (e.g., −12 degrees), or when the evaporation cylinder temperature reaches a set temperature value, the refrigeration solenoid valve is turned off, and the freezing cylinder mixing motor is stopped.

(2) After the refrigeration solenoid valve is turned off and the freezing cylinder mixing motor is stopped, the freshness-preserving solenoid valve and the material reservoir mixing motor remain turned on. When the freshness-preserving temperature reaches a set temperature value, the compressor is stopped, and the material reservoir mixing motor is operated intermittently according to a pattern of turning on for T5 and off for T6, where T5 and T6 are both 15 seconds, and T5 and T6 may also be in the range of 1 to 600 seconds.

(3) When the material temperature in the material reservoir rises to the upper limit value of the freshness-preserving temperature, step (2) is repeated.

(4) After the refrigeration solenoid valve is turned off and the freezing cylinder mixing motor is stopped, when the turn-off time of the refrigeration solenoid valve reaches a set time value T1 which is 90 minutes and the material temperature in the material reservoir rises to start the compressor, the refrigeration solenoid valve and the freezing cylinder mixing motor are turned on, and the solidification ratio of the ice-cream material in the material reservoir, the return gas temperature of the compressor, or the evaporator cylinder temperature is detected again to repeat the cycle of step (1), where T1 may also be in the range of 5 to 240 minutes.

(5) The on-off temperature difference of the freshness-preserving temperature is 5 degrees, and the range value of the on-off temperature difference may also be in the range of 0.2 to 15 degrees.

The freezing cylinder defrosting mode includes the following steps.

(1) At the time of defrosting, the compressor and the defrosting solenoid valve are turned on, and after a set time T7 which is 2 minutes, the freezing cylinder mixing motor is started.

(2) At the time of defrosting, the pre-cooling solenoid valve and the freshness-preserving solenoid valve are turned off.

(3) When the defrosting time reaches T7 which is 2 minutes or an evaporation temperature N3 reaches a set value of 25 degrees, defrosting is automatically stopped, where T7 may also be in the range of 1 to 20, and N3 may also be in the range of −10 to 80.

(4) When defrosting is completed for the first time, defrosting is performed for the second time within a time T8 which is 10 seconds, and the second defrosting time T9 is 30 seconds, where T8 may also be in the range of 1 to 240 seconds, and T9 may also be in the range of 1 to 180 seconds.

Embodiment 2

Figure 8:
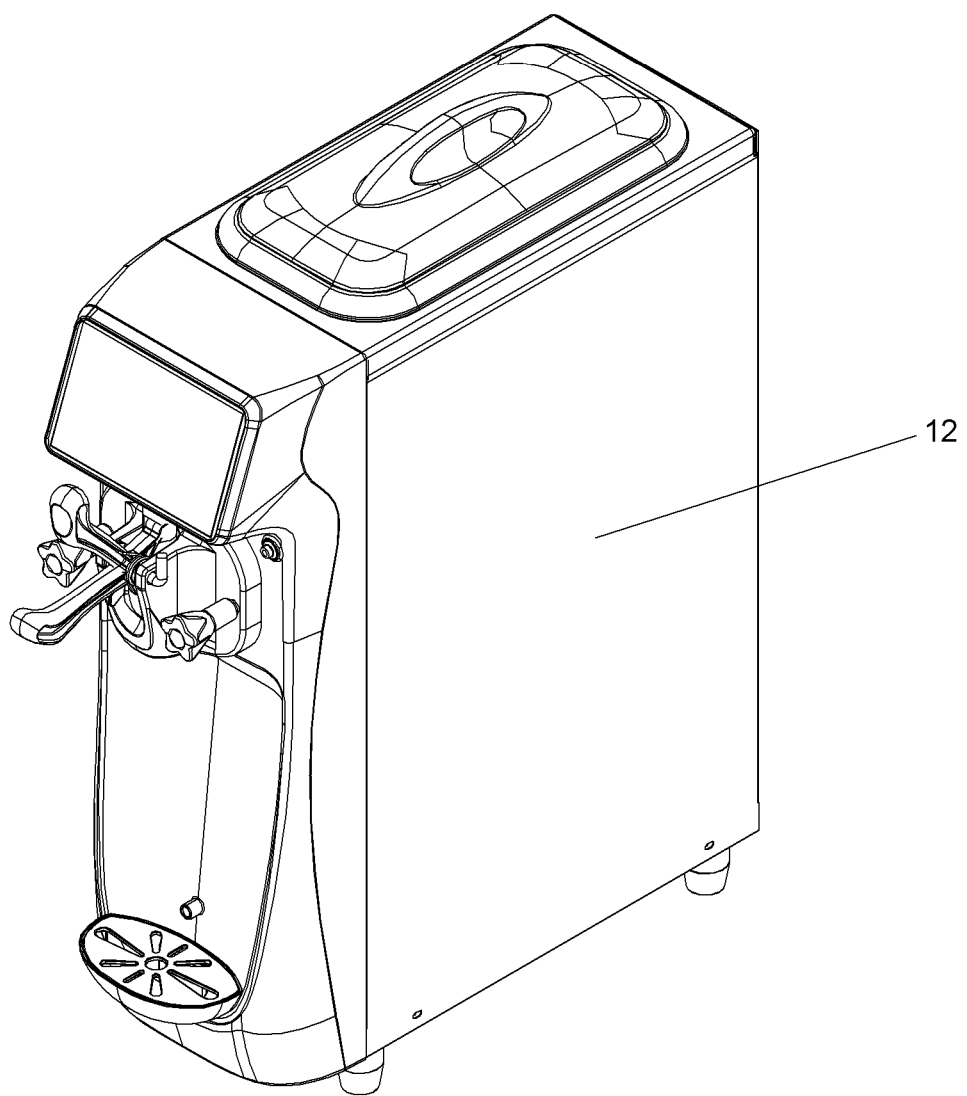
FIG. 8 is a schematic view of an overall structure of Embodiment 2 of a pre-cooling and freshness-preserving ice-cream machine employing dual throttling systems of the invention.
Figure 9:
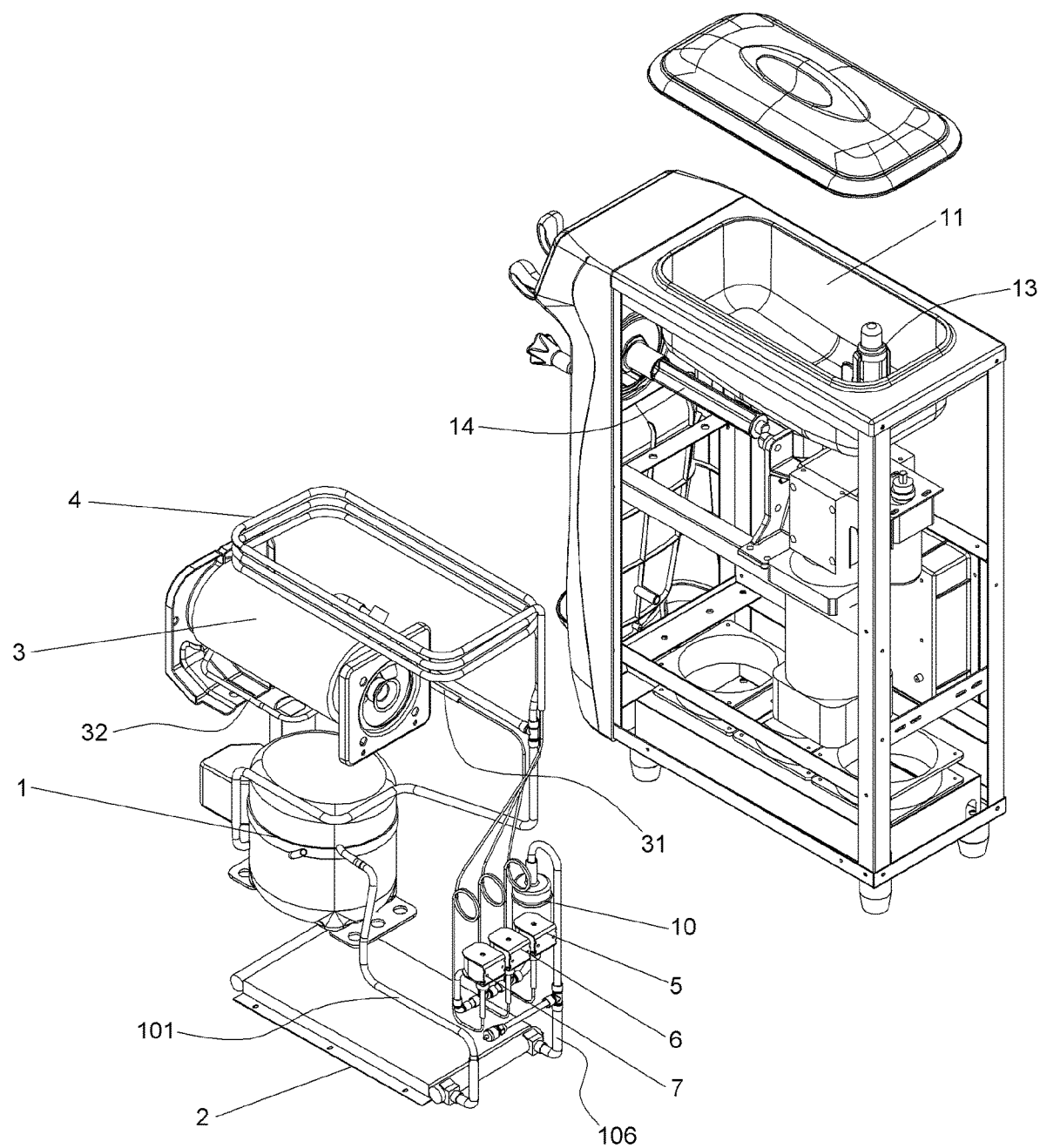
FIG. 9 is a partial exploded structural view of FIG. 8.
Figure 10:
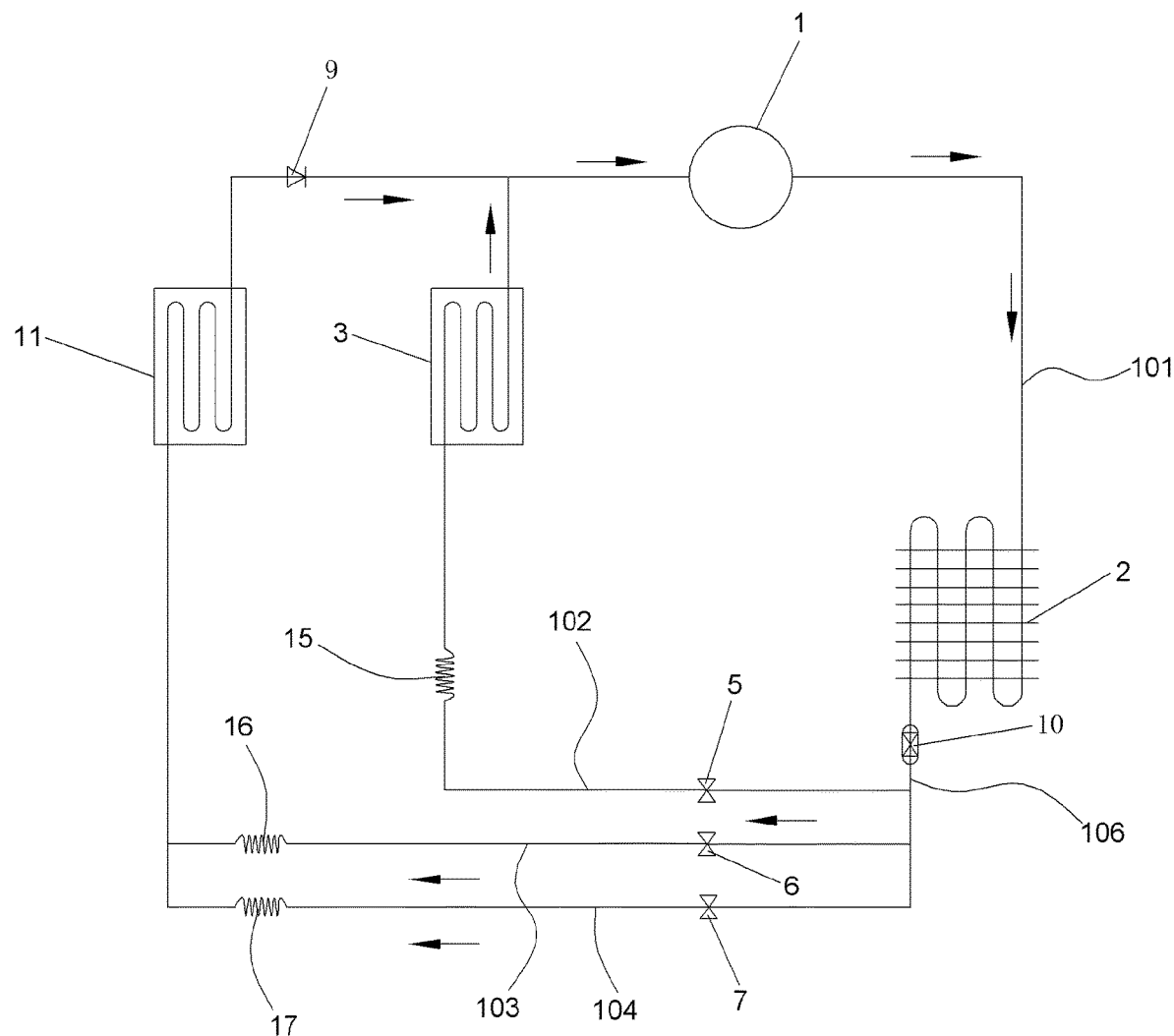
FIG. 10 is a schematic view of a refrigeration principle of the ice-cream machine shown in FIG. 8.

Embodiment 2 of the pre-cooling and freshness-preserving ice-cream machine employing dual throttling systems of the invention is as shown in FIG. 8 to FIG. 10. Different from Embodiment 1, the present embodiment is not provided with the defrosting pipe 105, so the defrosting process cannot be performed on the freezing cylinder, and the freezing cylinder defrosting mode is not available, either.

The above embodiments of the invention are not intended to limit the scope of the invention, and the embodiments of the invention are not limited thereto. Based on the above-mentioned contents of the invention, various other forms of modifications, replacements, or alterations of the above-described structure of the invention made in accordance with the ordinary skill and conventional means in the art should fall within the scope of the invention provided that they do not depart from the basic technical concept of the invention.

What is claimed is:

1. A pre-cooling and freshness-preserving cooling control device employing dual throttling systems for an ice-cream machine, the cooling control device comprising a compressor, a condenser, a material reservoir evaporator, a freezing cylinder refrigeration inlet conduit, and a freezing cylinder refrigeration outlet conduit, wherein the material reservoir evaporator is a coil surrounding a material reservoir, and the compressor is in communication with an inlet end of the condenser via a compression pipe, wherein an outlet end of the condenser is connected to a condenser outlet pipe, the condenser outlet pipe is in communication with three branch pipes respectively, the three branch pipes are a freezing cylinder refrigeration pipe, a material reservoir pre-cooling pipe, and a material reservoir freshness-preserving pipe which are arranged in parallel, the freezing cylinder refrigeration pipe is in communication with the freezing cylinder refrigeration inlet conduit, the material reservoir pre-cooling pipe and the material reservoir freshness-preserving pipe are both in communication with an inlet end of the material reservoir evaporator, an outlet end of the material reservoir evaporator and the freezing cylinder refrigeration outlet conduit are respectively in communication with the compressor, the freezing cylinder refrigeration pipe is provided with a refrigeration solenoid valve, a middle segment of the freezing cylinder refrigeration pipe is a freezing cylinder refrigeration capillary segment, the material reservoir pre-cooling pipe is provided with a pre-cooling solenoid valve, a middle segment of the material reservoir pre-cooling pipe is a material reservoir pre-cooling capillary segment, the material reservoir freshness-preserving pipe is provided with a freshness-preserving solenoid valve, and a middle segment of the material reservoir freshness-preserving pipe is a material reservoir freshness-preserving capillary segment, wherein the cooling control device is capable of separately controlling a pre-cooling mode and a freshness-preserving mode of the material reservoir to thereby achieve pre-cooling and freshness-preserving functions of the material reservoir.

2. The pre-cooling and freshness preserving cooling control device employing dual throttling systems for an ice-cream machine according to claim 1, wherein the freezing cylinder refrigeration capillary segment has an inner diameter of 0.5 mm to 1.8 mm and a length of 500 mm to 4000 mm.

3. The pre-cooling and freshness preserving cooling control device employing dual throttling systems for an ice-cream machine according to claim 1, wherein the material reservoir pre-cooling capillary segment has an inner diameter of 0.3 mm to 1.6 mm and a length of 500 mm to 3500 mm.

4. The pre-cooling and freshness preserving cooling control device employing dual throttling systems for an ice-cream machine according to claim 1, wherein the material reservoir freshness-preserving capillary segment has an inner diameter of 0.4 mm to 1.6 mm and a length of 500 mm to 3500 mm.

5. The pre-cooling and freshness preserving cooling control device employing dual throttling systems for an ice-cream machine according to claim 1, wherein the condenser outlet pipe is further provided with a filter on a tube segment before branching.

6. The pre-cooling and freshness preserving cooling control device employing dual throttling systems for an ice-cream machine according to claim 1, wherein the outlet end of the material reservoir evaporator is further provided with a check valve.

7. The pre-cooling and freshness preserving cooling control device employing dual throttling systems for an ice-cream machine according to claim 1, wherein a defrosting pipe further branches out from the compression pipe, an outlet end of the defrosting pipe is in communication with the freezing cylinder refrigeration inlet conduit, and the defrosting pipe is provided with a defrosting solenoid valve.

8. An ice-cream machine comprising the pre-cooling and freshness-preserving cooling control device employing dual throttling systems for an ice-cream machine according to claim 1, wherein the ice-cream machine further comprises a body, the material reservoir, a material reservoir mixer, a material reservoir mixing motor, a freezing cylinder, a freezing cylinder mixer, a freezing cylinder mixing motor, a discharge head, a sensor, an electronic control panel, and a control display panel, wherein the material reservoir mixer is installed in the material reservoir and is connected to the material reservoir mixing motor, the freezing cylinder mixer is inserted in the freezing cylinder and is connected to the freezing cylinder mixing motor, and the electronic control panel is configured to control operation of each component.

9. A cooling method for the pre-cooling and freshness-preserving cooling control device employing dual throttling systems for an ice-cream machine according to claim 1, wherein the method comprises a material reservoir pre-cooling mode and a material reservoir freshness-preserving mode, wherein the material reservoir pre-cooling mode comprises the steps below:
(1) automatically starting material reservoir pre-cooling according to a set program when freezing cylinder refrigeration is started;
(2) when the ice-cream machine is powered and started up for a first time, starting the pre-cooling solenoid valve to enter a work cycle only when a solidification ratio of an ice-cream material in the material reservoir is detected to rise to a set value and after a freezing cylinder refrigeration cycle is started;
(3) at any time, when a material is fed, stopping the pre-cooling solenoid valve for T seconds, and if no material is discharged in T seconds, turning on the pre-cooling solenoid valve, where T is in a range of 1 to 240; and
(4) a pre-cooling temperature is a set value of a freshness-preserving temperature+N1 degrees, and an on-off temperature difference of the pre-cooling temperature is N2 degrees; after the pre-cooling temperature is reached, turning off the pre-cooling solenoid valve, where N1 is in a range of 1 to 20° C., and N2 is in a range of 0.5 to 15° C.; and the material reservoir freshness-preserving mode comprises the steps below:
(1) when freshness preservation is initially started, starting freezing cylinder refrigeration, turning on a freezing cylinder mixing motor, the refrigeration solenoid valve and the freshness-preserving solenoid valve, and meanwhile, intermittently operating a material reservoir mixing motor according to a pattern of turning on for T3 and off for T4; when the solidification ratio of the ice-cream material in the material reservoir is detected to reach a set ratio value or when a return gas temperature of the compressor or an evaporation cylinder temperature reaches a set temperature value, turning off the refrigeration solenoid valve, and stopping the freezing cylinder mixing motor, where T3 and T4 are both in a range of 1 to 600 seconds;
(2) after the refrigeration solenoid valve is turned off and the freezing cylinder mixing motor is stopped, continually turning on the freshness-preserving solenoid valve and the material reservoir mixing motor; when the freshness-preserving temperature reaches a set temperature value, stopping the compressor, and intermittently operating the material reservoir mixing motor according to a pattern of turning on for T5 and off for T6, where T5 and T6 are both in a range of 1 to 600 seconds;
(3) when a material temperature in the material reservoir rises to an upper limit value of the freshness-preserving temperature, repeating step (2) of the material reservoir freshness-preserving mode;
(4) after the refrigeration solenoid valve is turned off and the freezing cylinder mixing motor is stopped, and after a turn-off time of the refrigeration solenoid valve reaches a set time value T1 and when the material temperature in the material reservoir rises to start the compressor, turning on the refrigeration solenoid valve and the freezing cylinder mixing motor, detecting again the solidification ratio of the ice-cream material in the material reservoir, the return gas temperature of the compressor, or the evaporator cylinder temperature to repeat a cycle of step (1) of the material reservoir freshness-preserving mode, where T1 is in a range of 5 to 240 minutes; and
(5) setting a range value of an on-off temperature difference of the freshness-preserving temperature to 0.2 to 15° C.

10. The cooling control method according to claim 9, further comprising a freezing cylinder defrosting mode, the freezing cylinder defrosting mode comprising the steps below:
(1) at a time of defrosting, turning on the compressor and the defrosting solenoid valve, and after a set time T7, starting the freezing cylinder mixing motor;
(2) at a time of defrosting, turning off the pre-cooling solenoid valve and the freshness-preserving solenoid valve;
(3) when a defrosting time reaches T7 or an evaporation temperature N4 reaches a set value, automatically stopping defrosting, where T7 is in a range of 1 to 20 minutes, and N3 is in a range of −10 to 80° C; and
(4) when defrosting is completed for a first time within a time T8, performing defrosting for a second time, and a second defrosting time is T9, where T8 is in a range of 1 to 240 seconds, and T9 is in a range of 1 to 180 seconds.

* * * * *